United States Patent [19]

Lee

[11] Patent Number: 5,656,872
[45] Date of Patent: Aug. 12, 1997

[54] COMMUNICATION CABLE FOR REDUCING ELECTROMAGNETIC WAVE INTERFERENCE AND FOR USE IN CONNECTING A COMPUTER MAIN BODY WITH A MONITOR

[75] Inventor: Jae-Do Lee, Kunpo-si, Rep. of Korea

[73] Assignee: Dae Sung Hi-Tech Co., Ltd., Inchon, Rep. of Korea

[21] Appl. No.: 256,109

[22] PCT Filed: Oct. 28, 1993

[86] PCT No.: PCT/KR93/00095

§ 371 Date: Mar. 16, 1995

§ 102(e) Date: Mar. 16, 1995

[87] PCT Pub. No.: WO94/10770

PCT Pub. Date: May 11, 1994

[30] Foreign Application Priority Data

Oct. 29, 1992 [KR] Rep. of Korea .................. 92-19984

[51] Int. Cl.$^6$ ............................................. H03H 7/00
[52] U.S. Cl. ......................... 307/91; 174/32; 333/167
[58] Field of Search ........................... 307/89, 91, 90, 307/326–328; 333/12, 167, 181; 174/35 R, 32–34; 315/8, 85; 313/313

[56] References Cited

U.S. PATENT DOCUMENTS 4,144,509  3/1979  Boutros .
4,215,325  7/1980  Sansone ........................... 333/167
5,168,251  12/1992 Zennamo, Jr. et al. ............ 333/12
5,519,434  5/1996  Fasquel ........................... 333/167

FOREIGN PATENT DOCUMENTS 56-132034  10/1981  Japan ............................. 307/91
61-107832   5/1986  Japan ............................. 307/91
60-238940  11/1995  Japan .

Primary Examiner—William M. Shoop, Jr.
Assistant Examiner—Richard T. Elms
Attorney, Agent, or Firm—Darby & Darby

[57] ABSTRACT

A communication cable for connecting a computer main body with a monitor to display an image on the monitor and to reduce electromagnetic wave interference, includes a plurality of video signal lines for transmitting video signals and ground lines respectively corresponding to the plurality of the video signal lines, each of the plurality of the video signal lines including a filter including an inductive element which is inserted in series with respect to the video signal line and a capacitive element which is connected in parallel between the video signal line and the ground line corresponding to the video signal line wherein respective nodes between the plurality of the capacitive elements each of which is included in the filter of the video signal line and the ground lines corresponding to the plurality of the video signal lines are connected with a common line. Thus, electromagnetic wave interference can be removed without variation of the video signal level.

7 Claims, 4 Drawing Sheets

COMMUNICATION CABLE FOR REDUCING ELECTROMAGNETIC WAVE INTERFERENCE AND FOR USE IN CONNECTING A COMPUTER MAIN BODY WITH A MONITOR

FIELD OF THE INVENTION

The present invention relates to a communication cable for connecting a computer main body with a monitor, and more particularly, to a communication cable for reducing electromagnetic wave interference.

DESCRIPTION OF THE PRIOR ART

Recently, as home-use computers are generally distributed, a considerable amount of higher harmonics being electromagnetic wave signals has been being generated to interfere with the operations of the other electromechanical apparatuses. Thus, most of the countries have the provisions in which an interference wave signal output should be attenuated from such an interference signal generating source so as to reduce a signal output of the interference wave.

A method or an apparatus for reducing the interference wave signal output has been disclosed in a variety of the prior art references. A filter using a ferrite sleeve of U.S. Pat. No. 4,144,509 or a filter using a structure of a monolithic capacitor having ferrite or not having ferrite of U.S. Pat. No. 3,538,464 can be enumerated as such an example.

However, such an apparatus is too expensive to be used in an inexpensive electronic product such as a personal computer. Thus, an inexpensive filter is required so as to be capable of satisfactorily attenuating an electromagnetic signal having an ultra high frequency, that is, frequencies up to 1,000 MHz. An available efficient filter attenuates an electromagentic signal having a frequency of 1,000 MHz by 30 decibel (dB).

In the other methods of smoothly transmitting a signal and removing such an interference wave component, a method for bypassing an interference wave using a capacitive filter or a method for enlarging an alternative resistance Using an inductive filter (a choke coil) can be used.

However, such a method using the capacitive filter or inductive filter causes several problems. That is, the method for largely reducing noise using a capacitor having a large capacitance greatly attenuates the signal waveform to cause a circuit to misoperate, while the method for reducing noise using an inductor having a large inductance greatly attenuates the signal waveform to cause the signal waveform to be distorted.

Moreover, such a capacitive filter or inductive filter has a good effect on removing the noise at a comparatively low frequency. However, at the high frequencies, an inductive coupling due to the residual inductance dependent upon a structure of a lead wire or an electrode and a drift capacitance which exists between lines become resonant at a particular frequency between several mega hertz and several tens of mega hertz. Accordingly, the effect of removing noise with respect to a particular high frequency has been lowered.

A combination filter using both a capacitive element and an inductive element can be used to transmit a desired frequency band for a load and prevent an undesired wave from being radiated. FIG. 1 shows such an example, in which an inductive element 12 which is inserted in series with respect to a load 16 causes a large impedance component with respect to an alternating component, while a capacitive element 14 which is connected in parallel to the load 16 plays a role of bypassing the alternating component.

Thus, since the components more than a predetermined frequency among a signal applied between input ends "A" and "B" are blocked by inductive element 12 and bypassed by capacitive element 14, only a signal from which the components more than a predetermined frequency are attenuated is transmitted for load 16.

However, when a characteristic impedance $Z_O$ of the line and an intrinsic impedance $Z_L$ Of the load 16 are not matched to each other, a reflected wave is generated from the load and is transmitted toward input ends "A" and "B". However, since such a reflected wave is bypassed by capacitive element 14 and is blocked by inductive element 12, the reflected wave is not transmitted toward input ends "A" and "B", but circulates a closed circuit constituted by load 16, capacitive element 14 and inductive element 12, to thereby provide undesired wave radiation.

Thus, to prevent generation of the reflected wave from the load, it is most desirable to match the line characteristic impedance with the load intrinsic impedance.

However, it is considerably difficult to match the line characteristic impedance with the load intrinsic impedance. That is, the line charactristic impedance is determined according to an equation $Z_O = \sqrt{L/C}$ by a value of the inductance L and the capacitance C. Here, since every line has every different inductance and capacitance value, every line has every different characteristic impedance.

Such a reason is because a skin effect is generated as a frequency is increased even in the same line, to thereby make a value of the inductance different from each other according to the frequency, and further an inductive coupling and a capacitive coupling are generated between the lines when several lines are located in a single cable.

One type of the communication cable for connecting the computer main body with the monitor comprises fifteen lines including three R, G and B signal lines in which R, G and B signals for displaying video signals, three ground lines corresponding to three R, G and B lines, a horizontal sync signal line and a ground line corresponding thereto, a vertical sync signal line and a ground line corresponding thereto, reserved lines and the corresponding ground lines, and a shield line. In this type of cable, a value of the inductance and a value of the floating capacitance are distributed over a considerably wide range. In this cable, a value of the inductance is 2 μH to 5 μH, and a value of the floating capacitance between any two lines among the R, G and B lines, the horizontal sync signal line and the vertical sync signal line is 100 pF to 500 pF. Accordingly, a value of the characteristic impedance is severely varied depending upon the type of the cable. Particularly, since a transmitted signal is a signal having a wide range of the frequency band from a low frequency of 50Hz to 60 Hz up to a high frequency of handreds of mega hertz, a value of the inductance is varied according to the frequency. Thus, it is very difficult to couple a line characteristic and a load intrinsic impedance.

SUMMARY OF THE INVENTION

Therefore, to solve the above problems, it is an object of the present invention to provide a communication cable for connecting a computer main body with a monitor to minimize frequency interference.

It is another object of the present invention to provide a communication cable for minimizing frequency interference and easily matching a cable with a monitor.

Besides, the present invention has a variety of the other objects. However, such objects will be detailedly described through the following detailed descriptions and preferred embodiments.

To accomplish the above object of the present invetion, there is provided a communication cable comprising:

a plurality of video signal lines for transmitting video signals from a computer main body to a monitor to display an image on the monitor; and ground lines respectively corresponding to the plurality of the video signal lines, each of the plurality of the video signal lines comprising a filter including an inductive element which is inserted in series with respect to the video signal line and a capacitive element which is connected in parallel between the video signal line and the ground line corresponding to the video signal line wherein respective nodes between the plurality of the capacitive elements each of which is included in the filter of the video signal line and the ground lines corresponding to the plurality of the video signal lines are connected with a common conductive wire.

The above object of the present invention can be accomplished by providing a communication cable comprising a plurality of signal transmission lines each of which has a pair of a ground line and another line, wherein at least three signal transmission lines of the communication cable are connected to a high frequency cutoff filter having a capacitive element which is connected in parallel between the respective signal transmission lines and the respective ground lines corresponding to the signal transmission lines and wherein nodes between the capacitive elements of the high frequency cutoff filter and the correpsonding ground lines are connected with a common conductive wire.

Thus, unnecessary harmonics of the signal applied to each line are blocked by an inductor which is inserted in series in a line having a high impedance component with respect to an alternating component and bypassed by a capacitor which is connected in parallel to a load. As a result, only a signal obtained by attenuating a component more than a predetermined frequency from the signal applied to the line is transmitted for a monitor.

Here, since the nodes between each capacitive element of the filter which is connected in parallel between each line and each corresponding ground line, and each ground line are connected with a single common conductive wire, each line operates as being equivalently grounded through a capacitor. Accordingly, a mutual induction coupling is not generated, to thereby prevent variation of a value of the inductance which can occur whenever a signal is transmitted.

Also, since capacity of the communication cable is determined by a total amount of capacitance of the capacitors, even though each line uses a device having a value of the small capacitance, an effect of using a device having a large value of the capacitance is obtained.

DESCRIPTION OF PREFERRED EMBODIMENTS OF THE INVENTION

Preferred embodiments of the present invention will be described below in more detail with reference to the accompanying drawings.

First Embodiment

Figure 1:
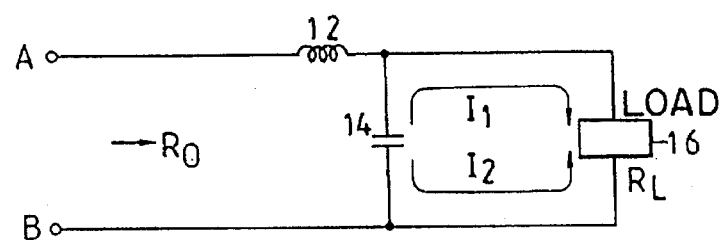
FIG. 1 is a general circuit diagram for explaining a principle of the present invention.
Figure 2:
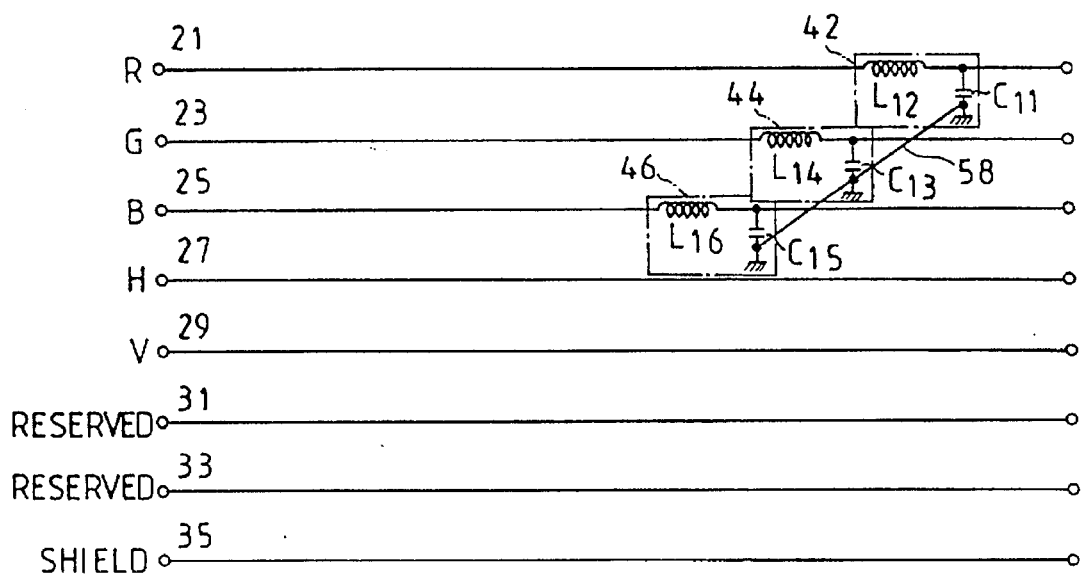
FIG. 2 is a circuit diagram showing one embodiment of the present invention.
Figure 3:
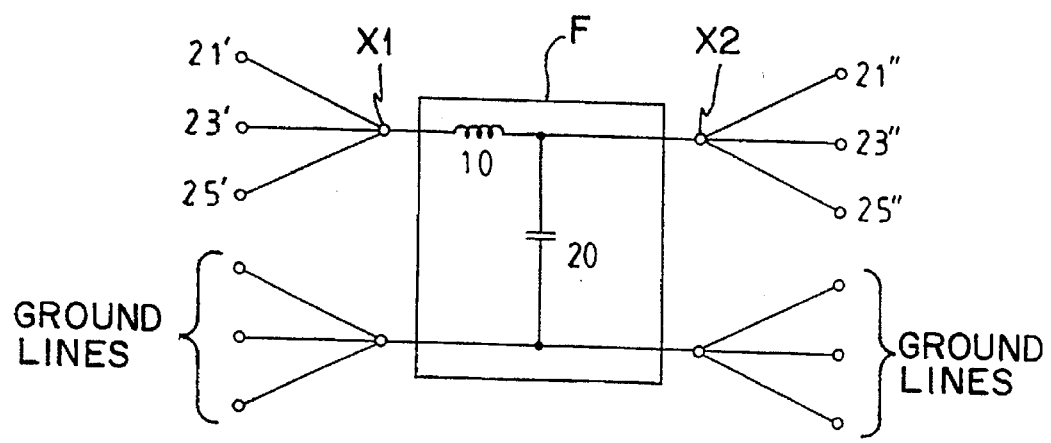
FIG. 3 is an equivalent circuit diagram of the FIG. 2 circuit.

FIG. 2 shows one embodiment of the present invention, and FIG. 3 shows an equivalent circuit of FIG. 2.

FIG. 2 shows a communication cable for connecting a monitor with a computer main body, to display a video signal transmitted from the computer main body on the monitor. The signal transmitted from the computer main body to the monitor includes a red video signal R, a green video signal G and a blue video signal B being video signals, a horizontal sync signal H and a vertical sync signal V.

Thus, the communication cable for connecting the monitor with the computer main body typically includes fifteen lines such as a red video signal line 21 through which red video signal R is transmitted, a green video signal line 23 through which a green video signal G is transmitted, a blue video signal line 25 through which a blue video signal B is transmitted, a horizontal sync signal line 27 through which horizontal sync signal H is transmitted, a vertical sync signal line 29 through which vertical sync signal V is transmitted, five ground lines (only the ground lines corresponding to the video signal lines 21, 23 and 25 are shown in FIG. 2) corresponding to the above signal lines 21, 23, 25, 27 and 29, respectively, two reserved lines 31 and 33 and two ground lines (not shown) corresponding to the reserved lines 31 and 33, and one shield line 35.

To display the images on the monitor, filters 42, 44 and 46 are connected with three video signal lines 21, 23 and 25 for transmitting the video signals for the monitor, respectively. The above filters 42, 44 and 46 are connected with video Signal lines 21, 23 and 25 in the same manner.

Filter 42 includes an inductive element $L_{12}$ which is inserted in series into red video signal line 21, and a capacitive element $C_{11}$ which is connected in parallel between red video signal line 21 and a ground line (no reference designation in the drawing) corresponding to red video signal line 21. Here, capacitive element $C_{11}$ has a bilateral characteristic.

Filter 44 includes an inductive element $L_{14}$ which is inserted in series into green video signal line 23, and a capacitive element $C_{13}$ which is connected in parallel between green video signal line 23 and a ground line (no reference designation in the drawing) corresponding to green video signal line 23. Here, since capacitive element $C_{13}$ has a bilateral characteristic. current flows in both directions. Filter 46 includes an inductive element $L_{16}$ which is inserted in series into blue video signal line 25, and a capacitive element $C_{15}$ which is connected in parallel between blue video signal line 25 and a ground line (no reference designation in the drawing) corresponding to blue video signal line 25. Here, capacitive element $C_{13}$ has a bilateral characteristic.

Thus, each filter of FIG. 2 is composed of the L-shaped filter.

A node between capacitive element $C_{11}$ constituting filter 42 which is connected with red video signal line 21 and the corresponding ground line, a node between capacitive element $C_{13}$ constituting filter 44 which is connected with green video signal line 23 and the corresponding ground line, and a node between capacitive element $C_{15}$ constituting filter 46 which is connected with blue video signal line 25 and the corresponding ground line, are connected with a common conductive wire 58 so as to form an electrical common connection node.

Such a constitution will be described referring to the equivalent circuit in view of the function and effect of the invention.

FIG. 3 shows an equivalent circuit of FIG. 2. The capacitors $C_{11}$, $C_{13}$ and $C_{15}$ in filters 42, 44 and 46 which are connected with the respective video signal lines have a common connection point while being connected to the corresponding ground lines. Thus, the respective video signal input ends 21', 23'and 25'are connected in common with a filter composed of an inductor L and a capacitor C through an input end X1, and the video signal output ends 21", 23" and 25" are connected in common to the output end X2. The inductor L of the filter F is inserted in series between input end X1 and output end X2, and capacitor C is connected in parallel with respect to inductor L inserted between input end X1 and output end X2. On the other hand, one end of capacitor C is grounded. Thus, the ground lines corresponding to the respective video signal lines are represented as a ground potential in FIG. 3. Here, the inductance of inductor L includes the respective individual inductance of inductors $L_{12}$, $L_{14}$ and $L_{16}$ of FIG. 2, the mutual inductance between the respective video signal lines and the distribution inductance distributed in the respective video signal lines. The capacitance of capacitor C includes the respective individual capacitance of capacitors $C_{11}$, $L_{13}$ and $L_{15}$ of FIG. 2, and the distribution capacitance distributed in the respective video signal lines.

Thus, the undesired harmonics among the signals applied to the respective lines are blocked by an inductor L which is inserted in series into the lines, and having a high impedance characteristic with respect to an alternating component, and is bypassed by a capacitor C which is connected in parallel to a load, to accordingly transmit only a signal from which a component more than a predetermined frequency is attenuated, for a monitor.

Here, inductor L having a high impedance characteristic with respect to an alternating component and which blocks the undesired harminics operates as if it connects in common with video signal lines 21, 23 and 25 for transmitting the video signals. Accordingly, respective video signal lines 21, 23 and 28 have the same blocking characteristics with respect to the the undesired harmonics. The capacitor C which operates as a bypass circuit with respect to the undesired harmonics operates as if it connects in common with all video signal lines 21, 23 and 25, to bypass the undesired harmonics. The undesired harmonics of respective video signal lines 21, 23 and 25 are blocked and bypassed.

Thus, the undesired harmonics which are transmitted for the monitor along with the respective video signals from the computer main body, are efficiently blocked, while an attenuation level or a blocking characteristic of the video signal attenuated when the video signal passes through the filter is not varied. Thus, level variation or different blocking characteristic is disappeared. Thus, the undesired harmonics can be removed without having an influence on the image to be displayed on the monitor.

Further, even though the capacitive elements each of which has a small capacity in the filters connected with the respective signal lines are used, this embodiment operates as if a capacitive element having a value of a large capacity were used. Thus, the level of the video signal which is transmitted from the computer main body to the monitor is not attenuated and effectively removes the undesired harmonics in the same manner as that using the capacitive element having a value of a large capacity.

Also, since a characteristic impedance of the line is determined by inductance of inductor L and capacitance of capacitor C, the line characteristic impedance and the intrinsic impedance of the load, that is, the monitor can be effectively matched, to thereby remove reflection of the undesired harmonics.

The undesired harmonics transmitted through the ground line are blocked by inductor L which is inserted in series into the line having a high impedance characteristic with respect to an alternating component, and is bypassed by capacitor C which is connected in parallel with the monitor. That is, the undesired harmonics are not transmitted toward the computer main body, to prevent leakage of the undesired harmonics.

Second Embodiment

Figure 4:
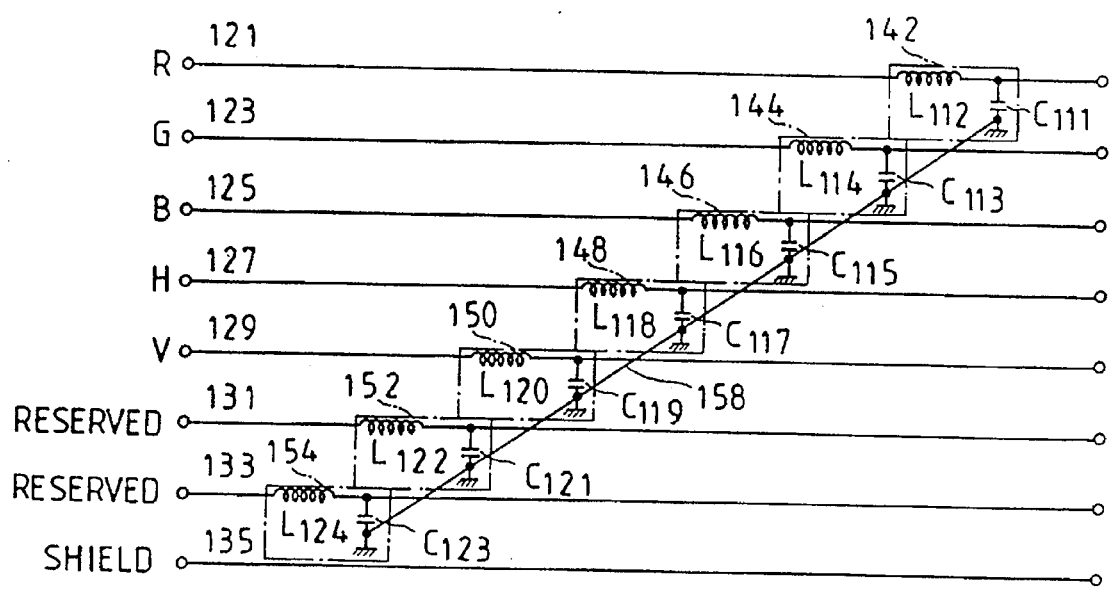
FIG. 4 is a circuit diagram showing another embodiment of the present invention, in which L-shaped filters are applied to all the signal lines, respectively.

Referring to FIG. 4, a communication cable connects a monitor with a computer main body, to display a video signal transmitted from the computer main body on the monitor. The signal transmitted from the computer main body to the monitor includes a red video signal R, a green video signal G and a blue video signal B being video signals, a horizontal sync signal H and a vertical sync signal V.

Thus, the communication cable for connecting the monitor with the computer main body typically includes fifteen lines such as a red video signal line 121 through which red video signal R is transmitted, a green video signal line 123 through which a green video signal G is transmitted, a blue video signal line 125 through which a blue video signal B is transmitted, a horizontal sync signal line 127 through which horizontal sync signal H is transmitted, a vertical sync signal line 129 through which vertical sync signal V is transmitted, five ground lines corresponding to the above signal lines 121, 123, 125, 127 and 129, respectively, two reserved lines 131 and 133 and two ground lines corresponding to the reserved lines 131 and 133, and one shield line 135.

To display the images on the monitor, filters 142, 144, 146, 148, 150, 152 and 154 are connected with three video signal lines 121, 123 and 125 for transmitting the video signals from the computer main body for the monitor, horizontal sync signal line 127 through which horizontal sync signal H is transmitted, vertical sync signal line 129 through which vertical sync signal V is transmitted, and two reserved signal lines 131 and 133, respectively. Since the above filters 142, 144, 146, 148, 150, 152 and 154 are connected with signal lines 121, 123, 125, 127, 129, 131 and 133 in the same manner, a filter 142 inserted into one video signal line, that is, red video signal line 121 will be described below as an example.

Filter 142 which is inserted into red video signal line 121 includes an inductive element $L_{112}$ which is inserted in series into red video signal line 121, and a capacitive element $C_{111}$ which is connected in parallel between red video signal line 121 and a ground line (no reference designation in the drawing) corresponding to red video signal line 121. Here, the filter is an L-shaped filter with respect to the line.

The connection nodes between capacitive elements $C_{111}$, $C_{113}$, $C_{115}$, $C_{117}$, $C_{119}$, $C_{121}$, and $C_{123}$ included in filters 142, 144, 146, 148, 150, 152 and 154 which are connected to signal lines 121, 123, 125, 127, 129, 131 and 133, are connected with a single conductive wire 158, to form a single common connection point.

The above embodiment basically has the same operation as that of the FIG. 2 constitution. However, since a value of the capacitance is larger than that of the FIG. 2 constitution, the blocking characteristic of the undesired harmonics is improved compared with that of the FIG. 2 constitution, but the video signal level is reduced.

Third Embodiment

Figure 5:
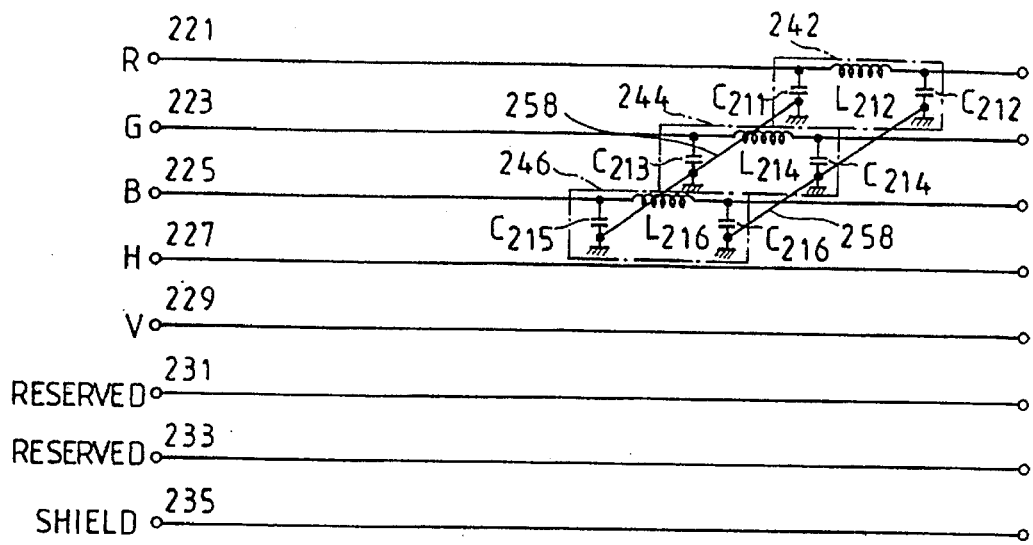
FIG. 5 is a circuit diagram showing still another embodiment of the present invention, in which π-shaped filters are applied to all the video signal lines, respectively.

Referring to FIG. 5, a communication cable connects a monitor with a computer main body, to display a video signal transmitted from the computer main body on the monitor. The signal transmitted from the computer main body to the monitor includes a red video signal R, a green video signal G and a blue video signal B being video signals, a horizontal sync signal H and a vertical sync signal V.

Thus, the communication cable for connecting the monitor with the computer main body typically includes fifteen lines such as a red video signal line 221 through which red video signal R is transmitted, a green video signal line 223 through which a green video signal G is transmitted, a blue video signal line 225 through which a blue video signal B is transmitted, a horizontal sync signal line 227 through which horizontal sync signal H is transmitted, a vertical sync signal line 229 through which vertical sync signal V is transmitted, five ground lines corresponding to the above signal lines 221, 223, 225, 227 and 229, respectively, two reserved lines 231 and 233 and two ground lines corresponding to the reserved lines 231 and 233, and one shield line 235

To display the images on the monitor, filters 242, 244 and 246 are connected with three video signal lines 221, 223 and 225 for transmitting the video signals from the computer main body for the monitor, respectively. Since the above filters 242, 244 and 246 are connected with signal lines 221, 223 and 225 in the same manner, a filter 242 inserted into one video signal line, that is, red video signal line 221 will be described below as an example.

Filter 242 which is inserted into red video signal line 221 includes an inductive element $L_{212}$ which is inserted in series into red video signal line 221, and capacitive elements $C_{211}$ and $C_{212}$ which are connected in parallel between red video signal line 221 and a ground line (no reference designation in the drawing) corresponding to red video signal line 221 at both ends of the inductive element $L_{212}$. Here, the filter is a π-shaped filter with respect to the line.

The connection nodes between capacitive elements $C_{211}$, $C_{212}$, $C_{213}$, $C_{214}$, $C_{215}$ and $C_{216}$ included in filters 242, 244 and 246 which are connected to respective signal lines 221, 223 and 225 and the respective ground lines, are connected with a single conductive wire 258, to form a single common connection point.

The above embodiment basically has the same operation as that of the FIG. 2 constitution.

Fourth Embodiment

Figure 6:
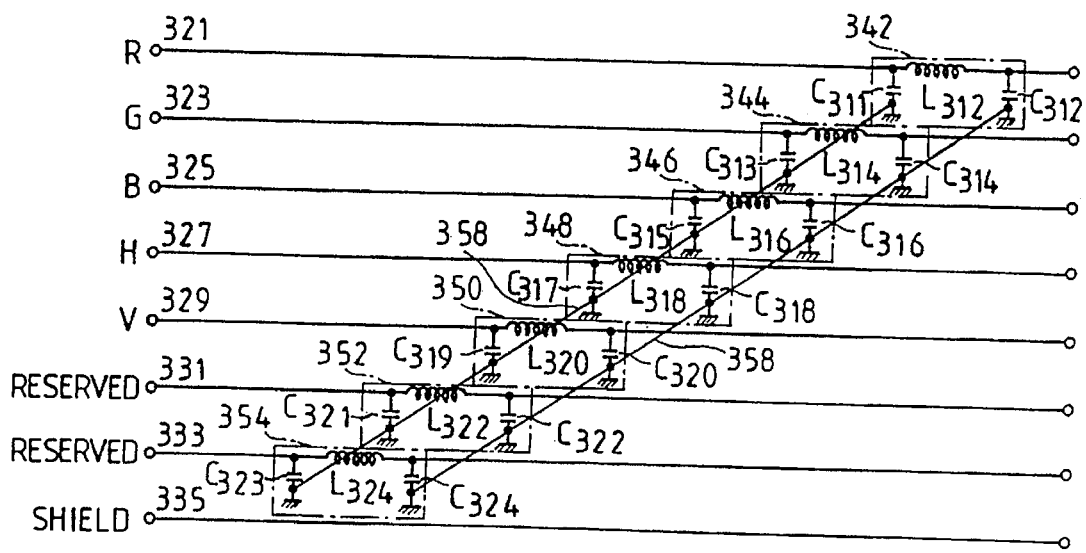
FIG. 6 is a circuit diagram, in which π-shaped filters are applied to all the signal lines.

Referring to FIG. 6, a communication cable connects a monitor with a computer main body, to display a video signal transmitted from the computer main body on the monitor. The signal transmitted from the computer main body to the monitor includes a red video signal R, a green video signal G and a blue video signal B being video signals, a horizontal sync signal H and a vertical sync signal V.

Thus, the communication cable for connecting the monitor with the computer main body typically includes fifteen lines such as a red video signal line 321 through which red video signal R is transmitted, a green video signal line 323 through which a green video signal G is transmitted, a blue video signal line 325 through which a blue video signal B is transmitted, a horizontal sync signal line 327 through which horizontal sync signal H is transmitted, a vertical sync signal line 329 through which vertical sync signal V is transmitted, five ground lines corresponding to the above signal lines 321, 323, 325, 327 and 329, respectively, two reserved lines 331 and 333 and two ground lines corresponding to the reserved lines 331 and 333, and one shield line 335.

To display the images on the monitor, filters 342, 344, 346, 348, 350, 352 and 354 are connected with three video signal lines 321, 323 and 325 for transmitting the video signals from the computer main body for the monitor, horizontal sync signal line 327 through which horizontal sync signal H is transmitted, vertical sync signal line 329 through which vertical sync signal V is transmitted, and two reserved signal lines 331 and 333, respectively. Since the above filters 342, 344, 346, 348, 350, 352 and 354 are connected to signal lines 321, 323, 325, 327, 329, 331 and 333 in the same manner, a filter 342 inserted into one video signal line, that is, red video signal line 321 will be described below as an example.

Filter 342 which is inserted into red video signal line 321 includes an inductive element $L_{312}$ which is inserted in series into red video signal line 321, a first capacitive element $C_{311}$ which is connected in parallel between one end of inductive element $L_{312}$ and a ground line (no reference designation in the drawing) corresponding to red video signal line 321 and a second capacitive element $C_{312}$ which is connected in parallel between the other end of inductive element $L_{312}$ and the ground line (no reference designation in the drawing). Here, the filter is a π-shaped filter with respect to the line.

The filters 342, 344, 346, 348, 350, 352 and 354 which are connected to respective signal lines 321, 323, 327, 329, 331 and 333 have the same constitution, respectively. The filters are all the π-shaped filters. The connection nodes between capacitive elements $C_{311}$, $C_{312}$, $C_{313}$, $C_{314}$, $C_{315}$, $C_{316}$, $C_{317}$, $C_{318}$, $C_{319}$, $C_{320}$, $C_{321}$, $C_{322}$, $C_{323}$ and $C_{324}$ included in the π-shaped filters, and the respectively corresponding ground lines, are connected with a single conductive wire 358, to form a single common connection point.

The above embodiment basically has the same operation as that of the FIG. 5 constitution. However, since a value of the capacitance is larger than that of the FIG. 5 constitution, the blocking characteristic of the undesired harmonics is improved compared with that of the FIG. 5 constitution, but the video signal level is reduced.

Fifth Embodiment

Figure 7:
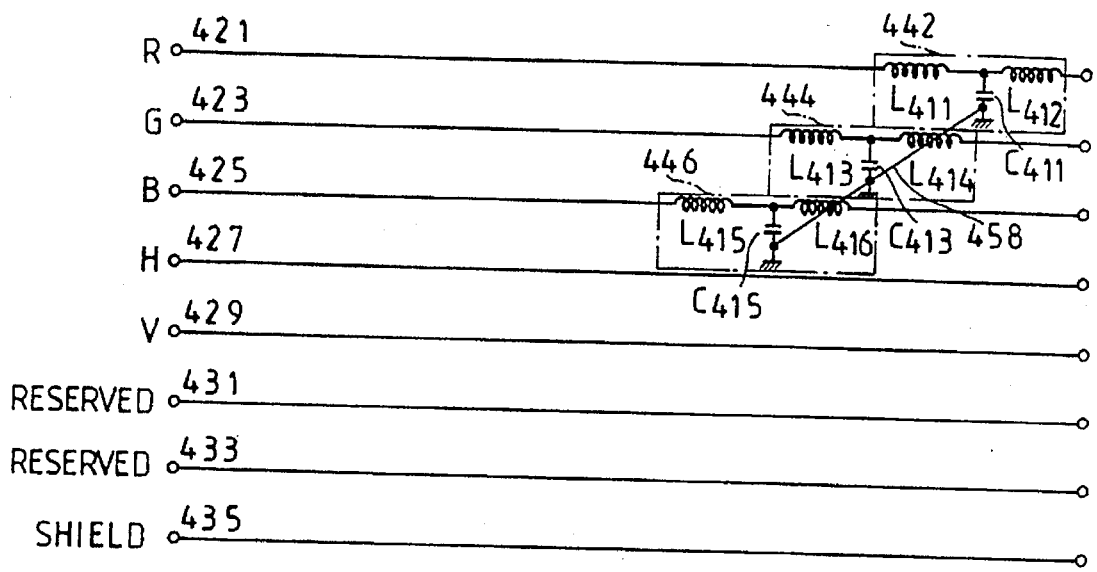
FIG. 7 is a circuit diagram showing yet another embodiment of the present invention, in which T-shaped filters are applied to all the video signal lines, respectively.

Referring to FIG. 7, a communication cable connects a monitor with a computer main body, to display a video signal transmitted from the computer main body on the monitor. The signal transmitted from the computer main body to the monitor includes a red video signal R, a green video signal G and a blue video signal B being video signals, a horizontal sync signal H and a vertical sync signal V.

Thus, the communication cable for connecting the monitor with the computer main body typically includes fifteen lines such as a red video signal line 421 through which red video signal R is transmitted, a green video signal line 423 through which a green video signal G is transmitted, a blue video signal line 425 through which a blue video signal B is transmitted, a horizontal sync signal line 427 through which horizontal sync signal H is transmitted, a vertical sync signal line 429 through which vertical sync signal V is transmitted, five ground lines corresponding to the above signal lines 421, 423, 425, 427 and 429, respectively, two reserved lines 431 and 433 and two ground lines corresponding to the reserved lines 431 and 433, and one shield line 435.

To display the images on the monitor, filters 442, 444 and 446 are connected with three video signal lines 421, 423 and 425 for transmitting the video signals from the computer main body for the monitor, respectively. Since the above filters 442, 444 and 446 are connected with signal lines 421, 423 and 425 in the same manner, a filter 442 inserted into one video signal line, that is, red video signal line 421 will be described below as an example.

Filter 442 which is inserted into red video signal line 421 includes two inductive elements, that is, a first inductive element $L_{411}$ and a second inductive element $L_{412}$ which are connected in series to each other and inserted into red video signal line 421, and a capacitive element $C_{411}$ which is connected in parallel between a connection node of first and second inductive elements $L_{411}$ and $L_{412}$ and a ground line (no reference designation in the drawing) corresponding to red video signal line 421. Here, the filter is a substantial T-shaped filter.

Thus, filters 442, 444 and 446 which are connected to video signal lines 421, 423 and 425 are all T-shaped filters. The connection nodes between capacitive elements $C_{411}$, $C_{413}$ and $C_{415}$ included in the T-shaped filters and the respective ground lines, are connected with a single conductive wire 458, to form a single common connection point.

The above embodiment basically has the same operation as that of the FIG. 2 constitution.

Sixth Embodiment

Figure 8:
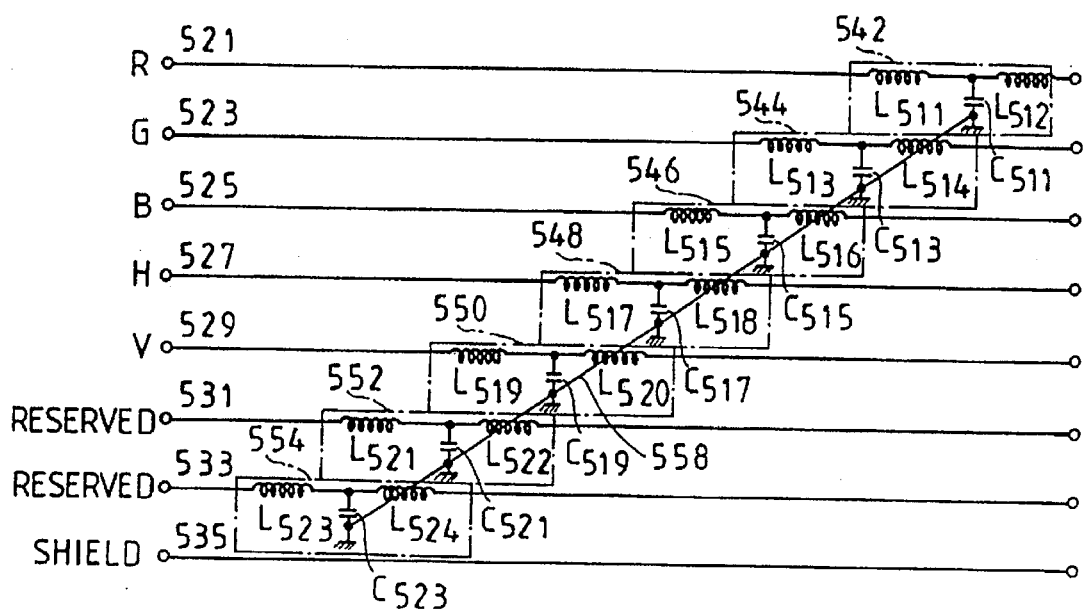
FIG. 8 is a circuit diagram, in which T-shaped filters are applied to all the signal lines.

Referring to FIG. 8, a communication cable connects a monitor with a computer main body, to display a video signal transmitted from the computer main body on the monitor. The signal transmitted from the computer main body to the monitor includes a red video signal R, a green video signal G and a blue video signal B being video signals, a horizontal sync signal H and a vertical sync signal V.

Thus, the communication cable for connecting the monitor with the computer main body typically includes fifteen lines such as a red video signal line 521 through which red video signal R is transmitted, a green video signal line 523 through which a green video signal G is transmitted, a blue video signal line 525 through which a blue video signal B is transmitted, a horizontal sync signal line 527 through which horizontal sync signal H is transmitted, a vertical sync signal line 529 through which vertical sync signal V is transmitted, five ground lines corresponding to the above signal lines 521, 523, 525, 527 and 529, respectively, two reserved lines 531 and 533 and two ground lines corresponding to the reserved lines 531 and 533, and one shield line 535.

To display the images on the monitor, filters 542, 544, 546, 548, 550, 552 and 554 are connected with three video signal lines 521, 523 and 525 for transmitting the video signals from the computer main body for the monitor, horizontal sync signal line 527 through which horizontal sync signal H is transmitted, vertical sync signal line 529 through which vertical sync signal V is transmitted, and two reserved signal lines 531 and 533, respectively. Since the above filters 542, 544, 546, 548, 550, 552 and 554 are connected with signal lines 521, 523, 525, 527, 529, 531 and 533 in the same manner, a filter 542 inserted into one video signal line, that is, red video signal line 521 will be described below as an example.

Filter 342 which is inserted into red video signal line 521 includes two inductive elements, that is, a first inductive element $L_{511}$ and a second inductive elements $L_{512}$ which are inserted in series into red video signal line 521, and a capacitive element $C_{511}$ which is connected in parallel between a connection point of first and second inductive elements $L_{511}$ and $L_{512}$ and a ground line (no reference designation in the drawing) corresponding to red video signal line 521. Here, the filter is a T-shaped filter with respect to the line.

The filters 542, 544, 546, 548, 550, 552 and 554 which are connected to respective signal lines 521, 523, 527, 529, 531 and 533 have the same constitution, respectively. The filters are all the T-shaped filters. The connection nodes between capacitive elements $C_{511}$, $C_{513}$, $C_{515}$, $C_{517}$, $C_{519}$, $C_{521}$ and $C_{523}$ included in the T-shaped filters are connected with a single conductive wire 558, to form a single common connection point.

The above embodiment basically has the same operation as that of the FIG. 7 constitution. However, since a value of the capacitance is larger than that of the FIG. 7 constitution, the blocking characteristic of the undesired harmonics is improved compared with that of the FIG. 7 constitution, but the video signal level is reduced.

What is claimed is:

1. A communication cable for connecting a computer main body with a monitor to display an image on the monitor and to reduce electromagnetic wave interference, said communication cable comprising:
   a plurality of video signal lines for transmitting video signals;
   a ground line corresponding to each one of said plurality of video signal lines;
   a plurality of filters corresponding to each one of said plurality of video signal lines, each said filter including at least one inductive element inserted in series with respect to the corresponding video signal line and at least one capacitive element connecting the video signal line and its corresponding ground line; and
   a common conductive wire connecting nodes formed between said at least one capacitive element and said corresponding around line of each said filter.

2. A communication cable for connecting a computer main body with a monitor to reduce electromagnetic wave interference according to claim 1, wherein said plurality of the video signal lines are at least three video signal lines including a red video signal line, a green video signal line and a blue video signal line.

3. A communication cable for connecting a computer main body with a monitor to display an image on the monitor and to reduce electromagnetic wave interference according to claim 1, further comprising:
   a horizontal sync signal line for transmitting a horizontal sync signal
   a horizontal ground line corresponding to said horizontal sync signal line;
   a first filter which is composed of an inductive element inserted in series to said horizontal signal line, and a capacitive element connecting the horizontal ground line;

a vertical sync signal line for transmitting a vertical sync signal;

a vertical ground line corresponding to the vertical sync signal line; and a second filter which is composed of an inductive element inserted in series to said vertical sync signal line, and a capacitive element connecting said vertical ground line;

wherein said common conductive wire connects nodes arising from a junction between the individual capacitive elements of the filters and the corresponding ground lines.

4. A communication cable for connecting a computer main body with a monitor to reduce electromagnetic wave interference according to claim 3, wherein said plurality of the video signal lines are at least three video signal lines including a red video signal line, a green video signal line and a blue video signal line.

5. A communication cable for connecting a computer main body with a monitor to reduce electromagnetic wave interference according to claim 1, wherein said filter is an L-shaped filter.

6. A communication cable for connecting a computer main body with a monitor to reduce electromagnetic wave interference according to claim 1, wherein each said video signal line includes at least two capacitive elements and said filter is a $\Pi$-shaped filter.

7. A communication cable for connecting a computer main body with a monitor to reduce electromagnetic wave interference according to claim 1, wherein each said video signal line includes at least two inductive elements and said filter is a T-shaped filter.

* * * * *